United States Patent [19]

Tsushima et al.

[11] 4,339,549
[45] Jul. 13, 1982

[54] PROCESS FOR FUSION BONDING OF FLUOROCARBON TYPE POLYMERS WHICH COMPRISES COUNTER-ION SUBSTITUTION PRIOR TO FUSION BONDING

[75] Inventors: Sakae Tsushima; Hiroshi Sagami, both of Yokohama, Japan

[73] Assignee: Asahi Kasei Kogyo Kabushiki Kaisha, Osaka, Japan

[21] Appl. No.: 258,637

[22] Filed: Apr. 29, 1981

[30] Foreign Application Priority Data

May 9, 1980 [JP] Japan ................................. 55/60725

[51] Int. Cl.$^3$ ........................ B32B 31/16; B01J 47/12
[52] U.S. Cl. ................................. 521/28; 156/73.1; 521/30
[58] Field of Search ..................... 521/28, 30; 156/73.1

[56] References Cited

U.S. PATENT DOCUMENTS

| | | | |
|---|---|---|---|
| 3,146,213 | 8/1964 | Small | 521/30 |
| 4,218,275 | 8/1980 | Kodija et al. | 156/73.1 |
| 4,284,460 | 8/1981 | Moore et al. | 521/27 |
| 4,290,833 | 9/1981 | Kodija et al. | 156/73.1 |

*Primary Examiner*—William F. Hamrock
*Assistant Examiner*—Peter F. Kulkosky
*Attorney, Agent, or Firm*—Birch, Stewart, Kolasch & Birch

[57] ABSTRACT

A fluorinated polymer having pendant cation exchange groups selected from sulfonic acid, carboxylic acid or sulfonamide groups, or their salts, is modified with a sulfonium compound and/or a phosphonium compound for substitution of the counter-ions of the cation exchange groups with sulfonium ions and/or phosphonium ions. The polymers treated in this manner are improved in their melt-flow characteristic to make fusion bonding between these polymers possible. The process is particularly suitable for repairing damaged cation exchange membranes for use in chlor-alkali electrolytic cells to advantageously elongate the life of the membranes.

16 Claims, No Drawings

PROCESS FOR FUSION BONDING OF FLUOROCARBON TYPE POLYMERS WHICH COMPRISES COUNTER-ION SUBSTITUTION PRIOR TO FUSION BONDING

This invention relates to a process for fusion bonding of fluorocarbon type cation exchange membranes having pendant group of at least one functional groups selected from sulfonic acid and salts thereof, carboxylic acid and salts thereof, and sulfonamide and salts thereof.

It is well known in the art that a fluorocarbon type cation exchange membrane having functional groups such as sulfonic acid groups, carboxylic acid groups, sulfonamide groups, etc. is useful as an ion-exchange membrane especially for separation of the anode from the cathode in a chlor-alkali electrolytic cell. These ion-exchange membranes may sometimes suffer from damages during usage such as bursting, pinholing, crack failure or others. A damaged membrane will be lowered in electrolytic performance and therefore it can no longer be used continuously or repeatedly. It would be very desirable to repair such a damaged membrane for re-use, thus enabling elongation of life of an expensive fluorocarbon type ion-exchange membrane.

As methods for repairing such a damaged membrane, one approach is a method wherein a patch of the same kind of membrane as that to be repaired is superposed on the membrane at the damaged portion to be fusion bonded thereto. According to this method, however, fusion bonding can only be accomplished with difficulty, since a fluorocarbon type ion-exchange membrane cannot successfully be heated to an elevated temperature without undergoing decomposition before it is molten. Another approach is a method disclosed in U.S. Pat. No. 4,246,353 or West German Pat. No. 2920639 wherein the fusion bonding is effected by heating membranes in the presence of an aqueous medium. This process has proved to be sufficiently useful for fusion bonding of smaller damaged portions but is unsatisfactory for fusion bonding of relatively larger damaged portions, because said process is required to be conducted under the conditions of relatively higher temperatures and pressures.

Under these circumstances, the present inventors have further made studies about the method for fusion bonding of fluorocarbon type polymers having cation exchange groups in order to overcome the disadvantages of the prior art as mentioned above. As a consequence, they have found that said fluorocarbon type polymer can be treated with a sulfonium compound or a phosphonium compound to modify the polymer at least on its surface so as to be readily molten with good melting flowability under the conditions of relatively lower temperatures and pressures, and thus have accomplished the present invention.

By using the process according to the present invention, it is also possible to readily work a fluorocarbon type cation exchange membrane by bonding into a cylinder- or bag-shaped product. Such a product can be suitably mounted on, for example, a finger-type electrolytic cell. Thus, an electrolytic cell fior the asbestos diaphragm process of the prior art can be utilized as such for the ion-exchange membrane process to a great economical advantage.

The present invention provides a process for fusion bonding of fluorocarbon type polymers having at least one pendant cation exchange group selected from sulfonic acid groups and salts thereof, carboxylic acid groups and salts thereof, and sulfonamide groups and salts thereof, said process being improved in melting flowability of said polymers through substitution of the counter-ions of the cation exchange groups with sulfonium ions and/or phosphonium ions by treatment of said polymers with a sulfonium compound and/or a phosphonium compound to thereby enable said polymers to be fusion bonded without decomposition.

The present invention is to be described in detail below.

The fluorocarbon type polymer to be used in the present invention may preferably be a fluorocarbon type cation exchanger having a pendant group structure of the formula:

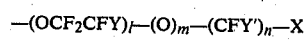

wherein each of Y and Y' represents a fluorine atom or a perfluoroalkyl group having 1 to 10 carbon atoms; X a sulfonic acid group, a carboxylic acid group, a sulfonamide group or salts thereof; l an integer of 0 to 3; m an integer of 0 or 1; and n an integer of 0 to 12.

The salts may be alkali metal salts such as sodium, potassium etc. and ammonium salts.

There is no specific limitation of the methods for preparation of such polymers in the present invention. According to a typical method, these polymers can be prepared by copolymerizing the monomers selected from the following two groups, respectively, at least one species from each group, followed by fabrication of the resultant copolymer. The first group of monomers consists of fluorinated olefinic compounds, including tetrafluoroethylene, hexafluoropropylene, chlorotrifluorethylene, fluorinated vinylidene and so on. The second group of monomers consists of olefinic compounds having sulfonylfluoride groups or carboxylic acid esters represented by the formula:

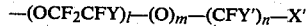

wherein each of Y and Y' represents a fluorine atom or a perfluoroalkyl group having 1 to 10 carbon atoms; X' a sulfonylfluoride group, or a $C_1$-$C_{10}$ alkyl ester of a carboxylic acid; l an integer of 0 to 3; m an integer of 0 or 1; and n an integer of 0 to 12.

Typical examples of such olefinic compounds are, for example,

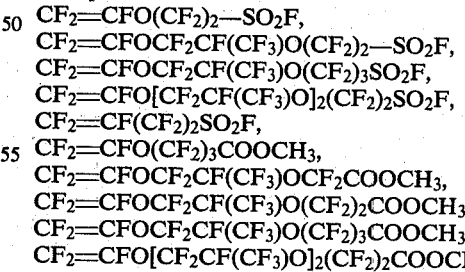

These monomers are copolymerized at a ratio such that the resultant copolymer may contain the functional groups in an amount generally in the range from 400 to 2000 in terms of equivalent weight (grams of a polymer containing one gram equivalent of functional groups).

There may also be employed a fluorinated polymer, of which a part or all of the sulfonyl groups are converted by chemical treatment to carboxylic acid groups or derivatives thereof, as disclosed in U.S. Pat. No.

4,151,053, West German OLS No. 2817315 and U.S. Pat. No. 4,200,711.

The polymers may be shaped in any form which is not specifically limited. In other words, the present invention can effectively be applied for fusion bonding of polymers of any desired shape, including membranes, granules, powders, etc. It is also effective for films reinforced with fibrous materials.

For conversion of the functional groups in the resultant polymer, if desired, to sulfonic acid groups and carboxylic acid groups, said polymer may be subjected to the treatment under conventional saponification conditions such as the treatment with an alcoholic aqueous alkali solution. Conversion to sulfonamide may be effected by treatment of sulfonylfluoride groups with ammonia, alkyl amines or others.

Referring now to the counter-ions of the cation exchange groups in the fluorinated polymers to be used in the present invention, it has been found that the counter-ions of the cation exchange groups are critical for improvement of the melting flowability of said polymers in fusion bonding thereof. In this regard, by use of sulfonium ions or phosphonium ions as counter-ions, the melting flowability of said polymers can be improved to such a great extent that fusion bonding thereof can easily be performed.

The sulfonium ion herein mentioned is represented by the formula: $[R_3S]^+$, wherein R represents an alkyl, an aryl or aralkyl group, and one of them may be replaced by a hydrogen atom. An alkyl or aralkyl group is preferable. Said alkyl group may preferably have carbon atoms of 1 to 10, more preferably 1 to 7. Said aryl group may have 6 to 10 carbon atoms, preferably 6 to 7. Said aralkyl group may have 7 to 10 carbon atoms, preferably 7. Typical examples are trimethyl sulfonium ion, triethyl sulfonium ion, tribenzyl sulfonium ion, etc. The phosphonium ion is represented by the formula: $[R_4P]^+$, wherein R is the same as defined above but one or two of them may be replaced by hydrogen atoms. Preferable is an alkyl or aryl group. Said alkyl has preferably 1 to 10, more particularly 1 to 7 carbon atoms, aryl group preferably 6 to 10, more particularly 6 to 7 carbon atoms and aralkyl group preferably 7 to 10, more particularly 7 carbon atoms, in order to give a stable compound. In particular, a quaternary phosphonium ion wherein all of the four groups represented by R are substituted with alkyl or aryl groups is preferred. Typical examples may include tetramethyl phosphonium ion, tetraethyl phosphonium ion, tetraphenyl phosphonium ion and the like.

Substitution of the counter-ions of the cation exchange groups in the fluorinated polymers with sulfonium ions or phosphonium ions may readily be effected by allowing said fluorinated polymers to be contacted with an aqueous solution of a sulfonium base or a salt thereof ($[R_3S]^+X^-$; $X^-=OH^-$ or a halogen ion), or a phosphonium base or a salt thereof ($[R_4P]^+X^-$; $X^-=OH^-$ or a halogen ion). As the solvent, water is preferred. But, for improvement of solubility, there may also be employed a mixture of water with an organic solvent such as an alcohol or a ketone, if desired. When substitution of the counter-ions of the cation exchange groups is conducted according to the ion-exchange method, the competing counter-ions (e.g. $Na^+$, $K^+$ or other ions) should be desirably suppressed to concentrations as low as possible.

The concentration of sulfonium and/or phosphonium ions in the above solution may generally be in the range from 0.01 to 0.5 N.

The effect of substitution is dependent on the degree of substitution. Generally speaking, however, the melt-flow characteristic can sufficiently be improved by substitution of the counter-ions of at least 10% of the total cation exchange groups, whereby fusion bonding can be performed more easily. Even with a substitution less than 10%, it is possible to obtain an effect corresponding to the degree of substitution, but it is preferred to obtain at least 10% substitution.

According to the present invention, the fluorinated polymers having cation exchange groups to be fusion bonded to each other may be either completely identical with each other or different in various aspects such as the cation exchange groups used, their equivalent weights or molecular weights, etc. The effect of the present invention is noticeable, if the counter-ions of the cation exchange groups in only one of these polymers to be fusion bonded are substituted with sulfonium ions and/or phosphonium ions. Of course, the counter-ions of both polymers may also be substituted.

In carrying out the fusion bonding, the counter-ions of the cation exchange groups in at least one of said polymers to be fusion bonded are converted to sulfonium ions and/or phosphonium ions before they are subjected to a heating press under either wet or dry conditions. This method is practically very effective when applied for such a process wherein a small piece of the polymer (hereinafter referred to as patch) is placed onto the damaged portion for fusion bonding, since it is only thereby required to treat only the patch with a sulfonium compound or a phosphonium compound.

As the heating method, there may be employed hot plate heating, ultrasonic wave heating, impulse heating, frictional heating, high frequency heating or others. Among them, in view of the working efficiency, the ultrasonic wave heating is the best. The heating temperature and the pressing pressure, which depend on the molecular weight of said polymers, presence of reinforcing materials, the ion-exchange groups employed, the shapes of the polymers, the percentage substitution of sulfonium ions and/or phosphonium ions, cannot unequivocally be defined. Generally speaking, however, fusion bonding may be effected at a temperature from 150° to 300° C., usually from 200° to 260° C. The fusion bonding can effectively be carried out under pressurization at generally 3 to 20 Kg/cm$^2$, preferably 5 to 10 Kg/cm$^2$. When ultrasonic waves are used, the recommendable conditions are generally 50 to 300 microns for the horn-tip vibrational amplitude, 5 to 60 Kg/cm$^2$ for the pressure and 0.1 to 10 seconds for the application duration.

The thus fusion bonded polymers are bonded firmly enough to be resistant to boiling with water, a 5 N aqueous caustic soda solution or a mixture of water and methanol.

According to the process of the present invention, which has been described in detail above, the melt-flow characteristic of a fluorocarbon type polymer, having pendant groups of at least one of sulfonic acid and salts thereof, carboxylic acid and salts thereof, and sulfonamide and salts thereof and being liable to be decomposed before it is molten, can be improved to make fusion bonding thereof feasible by treatment of at least one of said polymers to be fusion bonded with a sulfonium compound and/or a phosphonium compound to thereby substitute the counter-ions of the cation exchange groups thereof with sulfonium ions and/or phosphonium ions. The present invention is very effective especially for repairing the damaged portions of cation exchange membranes for chlor-alkali electrolysis through fusion bonding. In addition, it is also effective for fabrication of a cation exchange membrane into the shapes of cylinders or bags so as to make it mountable on, for example, a finger-type electrolytic cell.

The present invention is further illustrated by referring to the following Examples.

EXAMPLE 1

A film of 0.4 mm in thickness made of a copolymer of $CF_2=CF_2$ with $CF_2=CFOCF_2CF(CF_3)OCF_2CF_2SO_2F$ having a copolymerization ratio in terms of equivalent weight of 1500, which is reinforced with polytetrafluoroethylene fibers, is treated with a solution comprising 15% of potassium hydroxide, 30% of methanol and 55% of water to convert the pendant groups $-SO_2F$ in the polymer to $-SO_3K$.

Two sheets of the film polymer were treated by immersion in a 0.1 N aqueous trimethylsulfonium iodide solution at room temperature for 10 hours. While still under the wet state, the two sheets were superposed on each other and subjected to a heating press at 240° C. under a pressure of 10 Kg/cm² for 5 minutes. The resultant composite was found to have an adhesion resistant to a 5 N aqueous caustic soda solution for 10 hours.

EXAMPLE 2

A film of 0.3 mm in thickness made of a copolymer of $CF_2=CF_2$ with $CF_2=CFOCF_2CF(CF_3)O(CF_2)_3SO_2F$ having a copolymerization ratio in terms of equivalent weight of 1100 was subjected to the saponification treatment under the same conditions as in Example 1 to convert the pendant $-SO_2F$ groups in the polymer to $-SO_3K$. Two sheets of this film were treated with 2 N hydrochloric acid to convert the pendant groups to the form of $-SO_3H$. Then, only one of the sheets was converted to a sulfonium type by immersion in a 0.25 N aqueous tetraethylphosphonium base solution at room temperature for one hour. This film was superposed on the $-SO_3H$ type film and, while still under the wet state, subjected to a heating press at 260° C. under a pressure of 8 Kg/cm² for 6 minutes. The resultant product was found to be firmly bonded with sufficient resistance to boiling water.

EXAMPLE 3

A film-like molded article with a thickness of 0.4 mm of a copolymer of $CF_2=CF_2$ with $CF_2=CFOCF_2CF(CF_3)OCF_2CF_2SO_2F$ having a copolymerization ratio in terms of equivalent weight of 1200 was treated with ethylene diamine to convert a part of the $-SO_2F$ groups therein to sulfonamide groups. This film was further treated with a solution comprising 15% of sodium hydroxide, 30% of methanol and 55% of water to effect hydrolysis for conversion to the sodium form. The thus treated film was treated in a 0.15 N aqueous tetramethylphosphonium base solution at room temperature for 15 hours. Two sheets of the resultant film were superposed on each other and subjected to fusion bonding by means of an ultrasonic wave fusing device at a horn-tip vibrational amplitude of 200 microns under a pressure of 35 Kg/cm² for 2 seconds. The product obtained was found to be firmly bonded with sufficient resistance to boiling with a mixture comprising 15% of sodium hydroxide, 30% of methanol and 55% of water.

EXAMPLE 4

A 0.4 mm thick film of a copolymer of $CF_2=CF_2$ with $CF_2=CFOCF_2CF(CF_3)O(CF_2)_3SO_2F$ having a copolymerization ratio in terms of equivalent weight of 1300, reinforced with polytetrafluoroethylene fibers, was saponified similarly as in Example 1 to convert the $-SO_2F$ groups contained therein to $-SO_3K$ groups. Two sheets of this film-like polymer were treated with a 0.15 N aqueous trimethylsulfonium iodide solution at room temperature for 5 hours. The two sheets were layered on each other and fusion bonded within 3 seconds by means of an ultrasonic wave fusing device at a horn-tip vibrational amplitude of 120 microns under a pressure of 28 Kg/cm². The product was found to be firmly bonded with sufficient resistance to boiling water.

EXAMPLE 5

A film-like molded article with a thickness of 0.3 mm of a copolymer of $CF_2=CF_2$ with $CF_2=CFO(CF_2)_3COOCH_3$ having a copolymerization ratio in terms of equivalent weight of 1100 was saponified under the same conditions as in Example 1 to convert $-COOCH_3$ groups to $-COOK$. The resultant film was treated with a 0.15 N aqueous tetraphosphonium base solution at room temperature for 15 hours. With two sheets of this film laminated in layers, fusion bonding was effected by means or an ultrasonic fusing device at a horn-tip vibrational amplitude of 150 microns under a pressure of 30 Kg/cm² for one second. The product obtained was found to be firmly bonded with sufficient resistance to a boiling 5 N aqueous sodium hydroxide solution.

EXAMPLE 6

Copolymerization of $CF_2=CF_2$ with $CF_2=CFOCF_2CF(CF_3)-OCF_2CF_2SO_2F$ was carried out in 1,1,2-trichloro-1,2,2-trifluoroethane, using perfluoropropionyl peroxide as an initiator, while maintaining the temperature at 45° C. and the pressure at 5 Kg/cm². This polymer is called as Polymer-1. The same procedure was repeated except that the pressure was maintained at 3 Kg/cm². This polymer is called as Polymer-2.

A part of each of these polymers was hydrolyzed with a mixture of a 5 N aqueous caustic soda solution and methanol (volume ratio=1:1) at 90° C. for 16 hours to be converted to the form of sodium sulfonate. Ion-exchange capacities of these polymers were measured to obtain the results of 0.74 milliequivalent/g-dry resin for Polymer-1 and 0.91 milliequivalent/g-dry resin for Polymer-2, respectively. Polymer-1 and Polymer-2 were molded under heating to give films with thicknesses of 50 microns and 100 microns, respectively. Both of the thus molded films were combined and molded together under heating to provide a laminated film.

The laminated film was saponified with 2.5 N caustic soda/50% methanol at 60° C. for 16 hours, followed by treatment in 1 N hydrochloric acid to be returned to the H-form. Subsequently, the film was converted to the NH₄-form by treatment with a 1 N aqueous ammoniacal solution for 5 hours. The resultant film was then treated in a $PCl_5/POCl_3$ solution at 100° C. for 30 hours for conversion to sulfonyl chloride groups. After completion of the reaction, the treated film was washed with carbon tetrachloride and subjected to measurement by the attenuated total reflection method. There appeared strong absorption at 1420 cm$^{-1}$, which is a characteristic absorption of sulfonyl chloride groups. The film was not stained at all by staining with Crystal Violet. Two sheets of this film were then clamped between frames of an acrylic resin with the use of gaskets made of polytetrafluoroethylene, by arrangement of the films with the side of Polymer-1 facing outwardly. This assembly was immersed in a 57% aqueous hydroiodic solution to thereby permit only the surfaces on the sides of Polymer-1 to react with said solution at 80° C. for 24 hours.

The cross-sections of the resultant films were then stained with Crystal Violet, whereby it was found that they were stained in blue to the depth of 20 microns. Presence of carboxylic acid groups was also confirmed by the attenuated total reflection method. This film was treated in a chlorine gas at room temperature under normal pressure for 5 hours, followed by treatment in 2.5 N caustic soda/50% methanol at 90° C. for 40 hours for conversion to the form of the sodium salts of sulfonic acid and carboxylic acid. Thus, there was prepared a fluorocarbon type cation exchange membrane having carboxylic acid groups on one surface and sulfonic acid groups on the other. Two sheets of this cation exchange membrane were immersed in a 0.15 N aqueous trimethylsulfonium iodide solution at room temperature for 15 hours to be converted to the sulfonium ion type. These two sheets were press molded under heating at 250° C., under a pressure of 10 Kg/cm$^2$ for 5 minutes, with the sides of Polymer-2 being contacted with each other. The resultant membrane was found to have a sufficient adhesion to be resistant to boiling in a 5 N aqueous caustic soda solution for 10 hours.

EXAMPLE 7

In an autoclave made of stainless steel having a capacity of 300 c.c., there were charged 10 g of $CF_3=CFOCF_2CF(CF_3)O(CF_2)_3SO_2F$, 95 c.c. of water containing 1 ppm of cupric sulfate, 0.18 g of ammonium persulfate, 2.0 g of sodium hydrogen phosphate and 1.9 g of ammonium perfluorooctanoate. After the total mixture was emulsified, 5 c.c. of a 0.16% aqueous sodium hydrogen sulfite solution was added thereto. Then, while maintaining the temperature at 40° C., tetrafluoroethylene was fed into the mixture to effect copolymerization therewith under a pressure of 4 Kg/cm$^2$, whereby the pressure of tetrafluoroethylene was controlled so as to attain a constant polymerization rate.

The resultant polymer was found to contain 2.47% by weight of sulfur as measured by elemental analysis. A part of the polymer was hydrolyzed for measurement of the ion-exchange capacity thereof, which was found to be 0.72 meq/g-dry resin.

The above sulfonyl chloride type polymer was molded into a membrane with a thickness of 250 microns, and following the procedure similar to Example 6, there was prepared a fluorocarbon type cation exchange membrane having carboxylic acid groups in the surface stratum on one surface. Two sheets of this cation exchange membrane were immersed in a 0.10 N aqueous tetramethylphosphonium base solution to be converted to the phosphonium ion type. These two sheets were superposed on each other so as to be contacted on the sides bearing sulfonic acid groups and subjected to a heating press at 270° C. under a pressure of 7 Kg/cm$^2$ for 4 minutes. The product obtained was found to have a sufficient adhesion so as to be resistant to the treatment with 2.5 N caustic soda/methanol solution (volume ratio=1:1) at 60° C. for one day.

EXAMPLE 8

There were employed two films prepared according to the same method as in Example 5 having carboxylic acid groups, each being reinforced with polytetrafluoroethylene fibers and having sizes of 100 cm in width and 130 cm in length. These films were treated at marginal portions thereof to the width of about 10 cm with an aqueous trimethylsulfonyl iodide solution at room temperature for 15 hours.

Then, these two films were laminated on each other, while applying a heating press at one side in the width direction and two sides in the length direction at 260° C. under a pressure of 10 Kg/cm$^2$ for 5 minutes to effect bonding thereat, to be formed into a bag.

The bag obtained was found to be firmly bonded with sufficient resistance to boiling in a mixture comprising 15% sodium hydroxide, 30% methanol and 55% water.

EXAMPLE 9

Similarly as in Example 6, there was prepared a film with the sizes of 130 cm in width and 250 cm in length having carboxylic acid groups on one surface and sulfonic acid groups on the other, which film is reinforced with fibrous materials.

This film was immersed, at both shorter sides thereof to the depth of about 10 cm, in a 0.2 N aqueous tetraethylphosphonium base solution at room temperature for 10 hours.

Then, both the shorter sides thus treated were brought into contact with each other with the surface bearing carboxylic acid groups of one side and the surface bearing sulfonic acid groups of the other as the bonding surfaces. Fusion bonding was effected by means of an ultrasonic fusing device at a horn-tip vibrational amplitude of 150 microns under a pressure of 30 Kg/cm$^2$ for 30 seconds, to provide a cylindrical membrane.

This product was found to have an adhesion sufficiently resistant to the treatment in a 6.5 N aqueous caustic soda solution at 90° C. for 30 days or more.

EXAMPLE 10

According to the method similar to Example 5, there was prepared a film having carboxylic acid groups reinforced with polytetrafluoroethylene fibers. This film was then formed into a cylindrical membrane by fusion bonding using an ultrasonic fusing device in the same manner as described in Example 9.

The product was found to be adhered firmly enough to be resistant to the treatment in a 6.5 N aqueous caustic soda solution at 90° C. for 30 days or more.

We claim:

1. In a process for fusion bonding of two or more of fluorocarbon type polymers to each other, each polymer having at least one pendant cation exchange group selected from sulfonic acid groups and salts thereof, carboxylic acid groups and salts thereof, and sulfonamide groups and salts thereof, the improvement which comprises substituting the counter-ions of the ion-exchange groups in each of said polymers with sulfonium ions and/or phosphonium ions prior to fusion bonding.

2. A process according to claim 1, wherein the fluorocarbon type polymer has a pendant group structure of the formula:

$$-(OCF_2CFY)_l-(O)_m-(CFY')_n-X$$

wherein each of Y and Y' represents a fluorine atom or a perfluoroalkyl group having 1 to 10 carbon atoms; X a sulfonic acid group, a carboxylic acid group, a sulfonamide group or salts thereof; l an integer of 0 to 3; m an integer of 0 to 1; and n an integer of 0 to 12.

3. A process according to claim 1, wherein at least 10% of the counter-ions of the cation exchange groups are sulfonium ions and/or phosphonium ions.

4. A process according to claim 1, wherein only one of the fluorocarbon polymers has counter-ions which are sulfonium ions and/or phosphonium ions.

5. A process according to claim 1, wherein the sulfonium ion is represented by the formula $[R_3S]^+$: wherein R is an alkyl group having 1 to 10 carbon atoms, an aryl group having 6 to 10 carbon atoms, or an aralkyl group having 7 to 10 carbon atoms, one of them being replaceable by a hydrogen atom.

6. A process according to claim 5, wherein R is an alkyl group.

7. A process according to claim 5, wherein R is an aralkyl group.

8. A process according to claim 1, wherein the phosphonium ion is represented by the formula $[R_4P]^+$: wherein R is an alkyl group having 1 to 10 carbon atoms, an aryl group having 6 to 10 carbon atoms, or an aralkyl group having 7 to 10 carbon atoms, up to two of them being replaceable by hydrogen atoms.

9. A process according to claim 8, wherein R is an alkyl group.

10. A process according to claim 8, wherein R is an aryl group.

11. A process according to claim 1, wherein the fluorocarbon polymer is a fluorocarbon type cation exchange membrane reinforced with fluorocarbon type fibers.

12. A process according to claim 1, wherein the fusion bonding is effected by ultrasonic waves.

13. A process according to claim 1, wherein the percentage of the counter-ions substituted is at least 10% of the total cation exchange groups.

14. A process according to claim 1, wherein the fusion bonding is effected at a temperature in the range from 150 to 300° C. under a pressure of 3 to 20 Kg/cm².

15. A process according to claim 14, wherein the fusion bonding is effected at a temperature in the range from 200° to 260° C. under a pressure of 5 to 10 Kg/cm².

16. A process according to claim 12, wherein the fusion bonding is effected under the conditions of a horn-tip vibrational amplitude of 50 to 300 microns, a pressure of 5 to 60 Kg/cm² and an application time of 0.1 to 10 seconds.